(12) United States Patent
Gilmore et al.

(10) Patent No.: US 11,485,437 B2
(45) Date of Patent: Nov. 1, 2022

(54) BICYCLE SADDLE WITH VIBRATION ISOLATORS

(71) Applicant: Toyota Motor Engineering & Manufacturing North America, Inc., Plano, TX (US)

(72) Inventors: Paul A. Gilmore, Ann Arbor, MI (US); Umesh N. Gandhi, Farmington Hills, MI (US); Ryohei Tsuruta, Ann Arbor, MI (US); Brian J. Pinkelman, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 17/156,041

(22) Filed: Jan. 22, 2021

(65) Prior Publication Data

US 2022/0153370 A1 May 19, 2022

Related U.S. Application Data

(60) Provisional application No. 63/115,881, filed on Nov. 19, 2020.

(51) Int. Cl.
*B62J 1/02* (2006.01)
(52) U.S. Cl.
CPC ........................................ *B62J 1/02* (2013.01)
(58) Field of Classification Search
CPC .. F16F 1/32; F16F 2228/063; F16F 2228/066; B62J 1/02

USPC .................................................. 297/208, 209
See application file for complete search history.

(56) References Cited

U.S. PATENT DOCUMENTS

| | | | |
|---|---|---|---|
| 82,276 | A | 9/1868 | Belleville |
| 1,826,597 | A | 10/1931 | Brecht |
| 2,121,835 | A | 6/1938 | Sproul |
| 2,655,935 | A | 10/1953 | Kinbachs |
| 2,753,177 | A | 7/1956 | Boyd |

(Continued)

FOREIGN PATENT DOCUMENTS

| | | |
|---|---|---|
| CN | 202811955 U | 3/2013 |
| CN | 103899704 B | 11/2015 |

(Continued)

OTHER PUBLICATIONS

"Belleville Springs." Encyclopedia of Vibration, 2001. (Year: 2001).*

(Continued)

*Primary Examiner* — Sarah B McPartlin
(74) *Attorney, Agent, or Firm* — Christopher G. Darrow; Darrow Mustafa PC

(57) ABSTRACT

A saddle for a bicycle can be configured to provide improved vibration isolation performance. The saddle can include a saddle body. The saddle body can include a front region and a rear region. The saddle can include a plurality of isolators. The plurality of isolators can be operatively connected to the saddle body in the rear region. The plurality of isolators can include a stack of a plurality of conical springs. The saddle can include a rail member. The rail member can be operatively connected to the plurality of isolators. Further, the rail member can be operatively connected to the saddle body in the front region.

19 Claims, 10 Drawing Sheets

(56) References Cited

U.S. PATENT DOCUMENTS

| | | | |
|---|---|---|---|
| 2,973,015 A | 2/1961 | Thompson | |
| 2,991,655 A | 7/1961 | Jorgensen et al. | |
| 3,080,160 A | 3/1963 | Omer | |
| 3,366,082 A | 1/1968 | Ross | |
| 3,394,631 A | 7/1968 | Thompson | |
| 3,430,942 A | 3/1969 | Webb et al. | |
| 3,559,512 A | 2/1971 | Aggarwal | |
| 3,574,347 A | 4/1971 | Hughes | |
| 3,608,883 A | 9/1971 | Russold et al. | |
| 3,743,266 A | 7/1973 | Sturman et al. | |
| 3,836,195 A | 9/1974 | Teeri | |
| 3,856,242 A | 12/1974 | Cook | |
| 3,858,665 A | 1/1975 | Winker | |
| 3,873,079 A | 3/1975 | Kuus | |
| 3,980,016 A | 9/1976 | Taylor | |
| 4,168,101 A | 9/1979 | DiGrande | |
| 4,215,841 A | 8/1980 | Herring, Jr. | |
| 4,351,556 A | 9/1982 | Worringer | |
| 4,457,213 A | 7/1984 | Morgan | |
| 4,530,491 A | 7/1985 | Bucksbee et al. | |
| 4,612,429 A | 9/1986 | Milianowicz | |
| 4,779,852 A | 10/1988 | Wassell | |
| 4,799,654 A | 1/1989 | Eickmann | |
| 4,824,338 A | 4/1989 | Eickmann | |
| 4,850,643 A * | 7/1989 | Rollman | B62J 1/02 297/214 |
| 5,178,357 A | 1/1993 | Platus | |
| 5,222,709 A | 6/1993 | Culley, Jr. et al. | |
| 5,263,694 A | 11/1993 | Smith et al. | |
| 5,301,974 A | 4/1994 | Knapp | |
| 5,310,157 A | 5/1994 | Platus | |
| 5,390,903 A | 2/1995 | Fidziukiewicz | |
| 5,489,139 A | 2/1996 | McFarland | |
| 5,669,594 A | 9/1997 | Platus et al. | |
| 5,669,598 A | 9/1997 | Ticey et al. | |
| 6,007,148 A | 12/1999 | Yu | |
| 6,089,656 A | 7/2000 | Hais | |
| 6,270,065 B1 | 8/2001 | Hais | |
| 6,354,556 B1 | 3/2002 | Ritchie et al. | |
| 6,371,463 B1 | 4/2002 | Sorovshian | |
| 6,443,524 B1 | 9/2002 | Yu | |
| 6,530,564 B1 | 3/2003 | Julien | |
| 6,935,693 B2 | 8/2005 | Janscha et al. | |
| 6,939,097 B2 | 9/2005 | Carr et al. | |
| 7,152,839 B2 | 12/2006 | Mullinix et al. | |
| 7,822,522 B2 | 10/2010 | Wereley et al. | |
| 7,854,425 B2 | 12/2010 | Evans | |
| 7,874,576 B2 | 1/2011 | Gandhi | |
| 8,053,068 B2 | 11/2011 | Fanucci et al. | |
| 8,166,626 B2 | 5/2012 | Sereni et al. | |
| 8,185,988 B2 | 5/2012 | Wieland | |
| 8,366,082 B2 | 2/2013 | Evans | |
| 8,500,108 B2 * | 8/2013 | Rode | F16F 1/32 267/260 |
| 8,585,026 B2 | 11/2013 | Dittmar | |
| 8,919,751 B2 | 12/2014 | Kneidel | |
| 9,194,452 B2 | 11/2015 | Hawkins et al. | |
| 9,394,950 B1 | 7/2016 | Henry et al. | |
| 9,408,428 B2 | 8/2016 | Gaudet | |
| 9,950,760 B2 | 4/2018 | Ahnert et al. | |
| 9,957,007 B2 * | 5/2018 | Bigolin | B62J 1/08 |
| 10,371,229 B2 | 8/2019 | Gandhi et al. | |
| 10,532,672 B1 | 1/2020 | Pinkeiman et al. | |
| 10,677,310 B2 | 6/2020 | Gandhi et al. | |
| 11,137,045 B2 | 10/2021 | Gandhi et al. | |
| 11,338,711 B1 | 5/2022 | Gilmore et al. | |
| 2004/0245830 A1 | 12/2004 | Scheck et al. | |
| 2007/0138720 A1 | 6/2007 | Evans | |
| 2009/0226691 A1 | 9/2009 | Mankame et al. | |
| 2012/0018577 A1 | 1/2012 | Quiroz-Hernandez | |
| 2014/0265468 A1 | 9/2014 | Greenhill et al. | |
| 2015/0298580 A1 | 10/2015 | Kanai | |
| 2016/0009156 A1 | 1/2016 | Leonard et al. | |
| 2016/0068085 A1 | 3/2016 | Minde et al. | |
| 2018/0195570 A1 | 7/2018 | Churchill et al. | |
| 2018/0195571 A1 | 7/2018 | Churchill et al. | |
| 2018/0312086 A1 | 11/2018 | Meingast et al. | |
| 2019/0186587 A1 | 6/2019 | Gandhi et al. | |
| 2019/0186588 A1 * | 6/2019 | Gandhi | F16F 3/02 |
| 2019/0186589 A1 | 6/2019 | Gandhi et al. | |
| 2020/0238781 A1 | 7/2020 | Hadi | |
| 2020/0298732 A1 | 9/2020 | Gandhi et al. | |
| 2020/0393013 A1 * | 12/2020 | Schneider | F16F 3/02 |
| 2022/0144152 A1 | 5/2022 | Gilmore et al. | |
| 2022/0145957 A1 | 5/2022 | Gilmore et al. | |
| 2022/0145958 A1 | 5/2022 | Gilmore et al. | |

FOREIGN PATENT DOCUMENTS

| | | |
|---|---|---|
| CN | 114033062 A | 2/2022 |
| JP | 2011201378 A | 10/2011 |
| KR | 102106610 B1 | 5/2020 |
| TW | M612680 U | 6/2021 |
| WO | 2009027681 A1 | 3/2009 |

OTHER PUBLICATIONS

Carella et al., "Demonstrator to show the effects of negative stiffness on the natural frequency of a simple oscillator", MES (2008) Proceedings of the Institution of Mechanical Engineers, Part C: Journal of Mechanical Engineering Science, vol. 222 (7), pp. 1189-1192 (4 pages).

Le, Thanh Dahn et al., "Experimental investigation of a vibration isolation system using negative stiffness structure", International Journal of Mechanical Sciences (2013) International Journal of Mechanical Sciences 170 (2013) 99-112 (14 pages).

Lee, Thanh Danh et al., "A vibration isolation system in low frequency excitation region using negative stiffness structure for vehicle seat", Journal of Sound and Vibration 330 (2011) 6311-6335 (25 pages).

Lee, C.M, et al., "A multi-stage high-speed railroad vibration isolation system with "negative" stiffness", Journal of Sound and Vibration 331 (2012) 914-921 (8 pages).

Lee, et al., "Position control of seat suspension with minimum stiffness," Journal of Sound and Vibration 292 (2006) 435-442 (8 pages).

U.S. Appl. No. 17/156,185.
U.S. Appl. No. 17/571,951.
U.S. Appl. No. 17/571,940.
U.S. Appl. No. 17/205,991.
U.S. Appl. No. 17/205,944.
U.S. Appl. No. 17/156,135.

Panagiotopoulos et al., "Advanced ultra-light multifunctional metallic-glass wave springs", Materials and Design, 2020 (10 pages).

Spaggiari et al., "Multiphysics Modelling and Design of Shape Memory Alloy Wave Springs as Linear Actuators", Proceedings of the ASME 2010 Conference on Smart Materials, Adaptive Structures and Intelligent Systems, Sep. 28-Oct. 1, 2010, Philadelphia, PA (9 pages).

Li et al., "A highly adjustable magnetorheological elastomer base isolator for real-time adaptive control", Smart Materials and Structures, Aug. 2013 (25 pages).

* cited by examiner

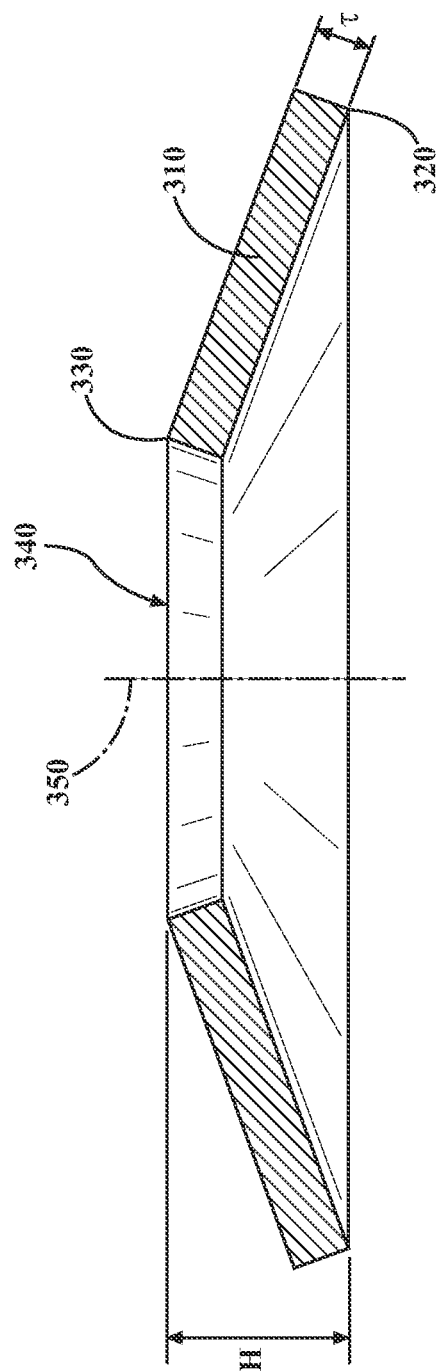

BICYCLE SADDLE WITH VIBRATION ISOLATORS

CROSS-REFERENCE TO RELATED APPLICATIONS

This application claims the benefit of U.S. Provisional Application No. 63/115,881, filed on Nov. 19, 2020, which is incorporated herein by reference in its entirety.

FIELD

The subject matter described herein relates in general to saddles and, more particularly, to bicycle saddles.

BACKGROUND

A bicycle saddle, typically referred to as a bicycle seat, is designed to support a portion of a rider's body. The height of the saddle is often adjustable. The saddle can be made in various shapes and sizes. The saddle can be configured to provide some amount comfort for the rider, such as by including padding.

SUMMARY

In one respect, the present disclosure is directed to a bicycle saddle. The bicycle saddle can include a saddle body. The saddle body can include a front region and a rear region. The bicycle saddle can include a plurality of isolators. The plurality of isolators can be operatively connected to the saddle body in the rear region. The plurality of isolators can include a stack of a plurality of conical springs. The bicycle saddle can include a rail member. The rail member can be operatively connected to the plurality of isolators. The rail member can be operatively connected to the saddle body in the front region.

In another respect, the present disclosure is directed to a bicycle saddle. The bicycle saddle can include a saddle body. The saddle body can include a front region and a rear region. The bicycle saddle can include a plurality of isolators. The plurality of isolators can be operatively connected to the saddle body in the rear region. The plurality of isolators can be configured to exhibit a non-linear stiffness profile including a region of quasi-zero stiffness. The plurality of isolators can include a stack of a plurality of conical spring. The plurality of isolators can include a plurality of spacers. Each spacer can separate a neighboring pair of the plurality of conical springs. The bicycle saddle can include a rail member. The rail member can be operatively connected to the plurality of isolators. The rail member can being operatively connected to the saddle body in the front region by a revolute connection.

BRIEF DESCRIPTION OF THE DRAWINGS

FIG. 3 is a cross-sectional view of an example of a conical spring used in an isolator for the bicycle saddle.

DETAILED DESCRIPTION

Figure 1A:
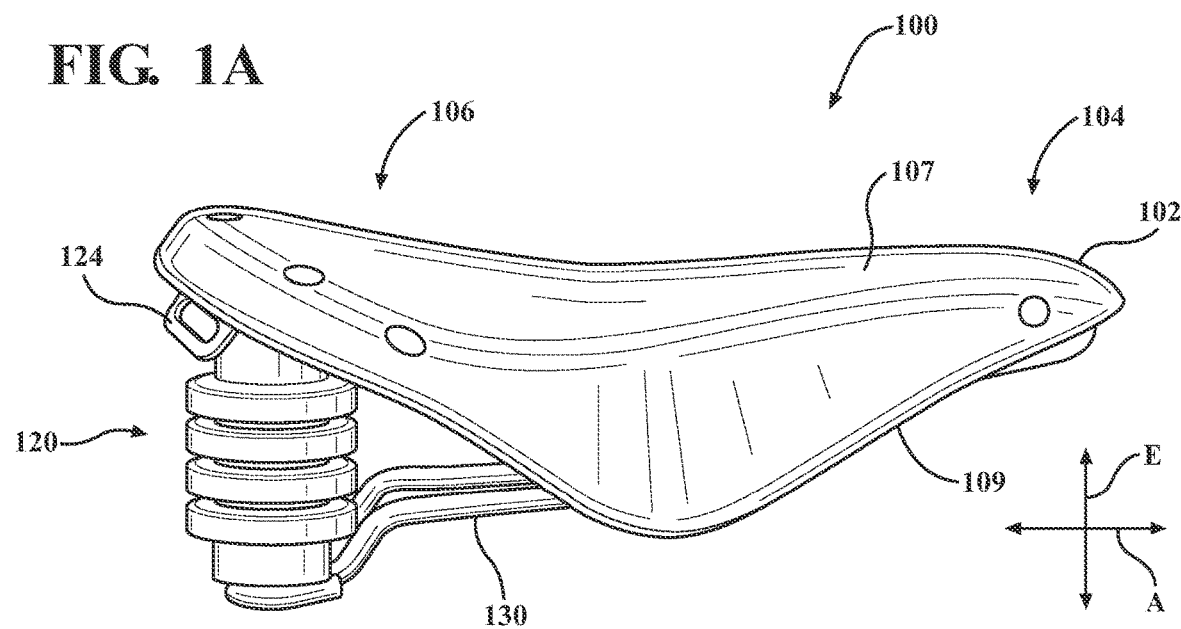
FIG. 1A-1D show various views of an example of a bicycle saddle.
Figure 1B:
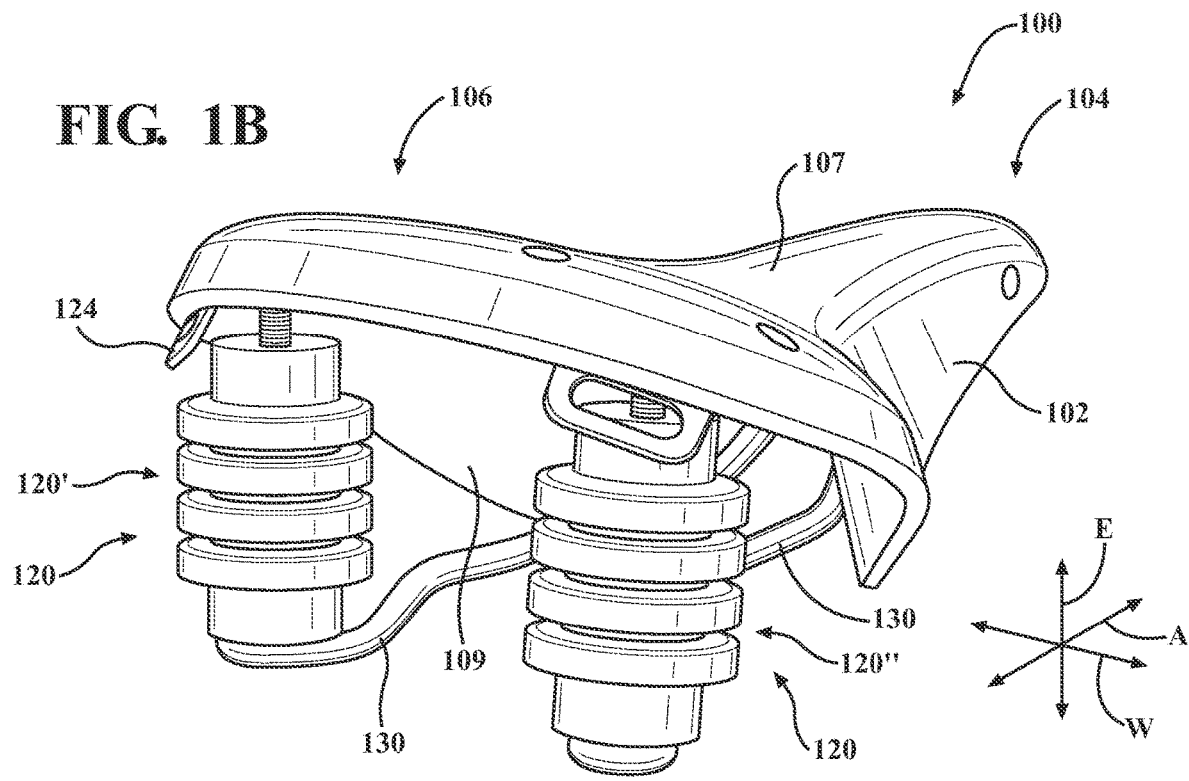

When in use, a bicycle may be driven over rough or otherwise non-smooth surfaces. As a result, vibrations may be transmitted to the bicycle seat or saddle. These vibrations can cause rider discomfort and/or reduce ride quality. Accordingly to arrangements described herein, a bicycle saddle can be configured to manage vibrations and/or forces that may be encountered during bicycle use.

The bicycle saddle can include a saddle body and a plurality of isolators operatively connected to the saddle body. The plurality of isolators can include a stack of a plurality of conical springs. The bicycle saddle can include a rail member that is operatively connected to the plurality of isolators. The rail member can also be operatively connected to the saddle body in a front region of the saddle body.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7B, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1A-1D, an example of a seat or saddle 100 for a bicycle is shown. The saddle 100 can be operatively connected to a frame of a bicycle in any suitable manner, now known or later developed.

The saddle 100 can include a saddle body 102. The saddle body 102 can be made of any suitable material, including plastics, metal, fabric, or any combination thereof. The saddle body 102 can include a front region 104 and a rear region 106. The saddle body 102 can include an upper side 107 and a lower side 108. It should be noted that the positional terms, such as "front", "rear", "upper", and "lower", are used to indicate the relative position of the respective items when the saddle 100 is used in its intended operational position. These terms are used for convenience to facilitate the discussion and are not intended to be limiting.

The saddle body 102 can have any suitable shape. In one or more arrangements, the rear region 106 can have a wider shape than the front region 104. The saddle body 102 can have an axial direction A, which can generally correspond to the forward-aft direction of the saddle body 102. The saddle body 102 can also include an elevational direction E. The saddle body 102 can further include a lateral or widthwise direction W.

In some arrangements, the saddle 100 can include padding operatively connected to the saddle body 102. The padding can provide support, cushioning, and/or comfort to a user. However, in other arrangements, the saddle 100 may not include padding.

The saddle 100 can include a plurality of isolators 120. Arrangement herein will be described in connection with a saddle 100 that includes two isolators. However, it will be appreciated that, in some arrangements, the saddle 100 can include a single isolator or more than two isolators. In the example shown in FIGS. 1A-1D, there can be a first isolator 120' and a second isolator 120". In one or more arrangements, the first isolator 120' and the second isolator 120" can be substantially identical to each other. In other arrangements, the first isolator 120' and the second isolator 120" can be different from each other in one or more respects. The first isolator 120' and the second isolator 120" can be spaced from each other in the widthwise direction W. The first isolator 120' and the second isolator 120" can be substantially aligned with each other along the axial direction A.

The plurality of isolators 120 can be operatively connected to the saddle body 102 in the rear region 106. The plurality of isolators 120 can be operatively connected to the saddle body 102 in any suitable manner, now known or later developed. For instance, the plurality of isolators 120 can be operatively connected to the saddle body 102 by one or more fasteners, one or more forms of mechanical engagement, one or more adhesives, one or more other ways, and/or any combination thereof. In the example shown in FIG. 1B, the plurality of isolators 120 can be operatively connected to the saddle body 102 by one or more bolts. In some arrangements, the bolts can connect the isolators 20 to a saddle frame 124, which, in turn, can be operatively connected to the saddle body 102 in any suitable manner, including any of the ways described herein.

The saddle 100 can include a rail member 130. The rail member 130 can be a single piece, or the rail member 130 can be made of a plurality of pieces. The rail member 130 can be made of any suitable material, such as a metal.

The rail member 130 can have any suitable size, shape, and/or configuration. One example configuration of the rail member 130 is shown in FIGS. 1A-1D, but it will be understood that other arrangements are possible. In one or more arrangements, the rail member 130 can include a substantially U-shaped region 132. The rail member 130 can include arms 134, 136 that extend away from the substantially U-shaped region 132. The arms 134, 136 can include one or more bends, curves, or non-straight features. Portions of the arms 134, 136 can extend in a substantially straight manner. The arms 134, 136 can extend substantially parallel to each other, along at least a portion of their length. In some arrangements, the arms 134, 136 can generally diverge from each other as they extend away from the substantially U-shaped region 132.

The arm 134 can extend to a first end region 135, and the arm 136 can extend to a second end region 137. The first end region 135 and the second end region 137 can have any suitable size, shape, and/or configuration. In one or more arrangements, the first end region 135 and the second end region 137 can be substantially identical to each other. However, in one or more arrangements, the first end region 135 and the second end region 137 can be different from each other in one or more respects. In the example shown in FIGS. 1A-1D, the first end region 135 and the second end region 137 can include the respective arms 134, 136 being bent back upon themselves.

The rail member 130 can be located on the lower side 108 of the saddle body 102. The rail member 130 can be operatively connected to the plurality of isolators 120. As an example, the first end region 135 of the rail member 130 can be operatively connected to the first isolator 120', and the second end region 137 of the rail member 130 can be operatively connected to the second isolator 120". Any suitable form of operative connection between the rail member 130 and the plurality of isolators 120 can be used, such as one or more fasteners, one or more forms of mechanical engagement, one or more adhesives, one or more other ways, and/or any combination thereof. In the example shown in FIGS. 1C-1D, the rail member 130 can be operatively connected to the isolators 120 by one or more bolts 138.

The rail member 130 can be operatively connected to the saddle body 102 in the front region 104. More particularly, the rail member 130 can operatively connected to the saddle body 102 in the front region 104 by a revolute connection 140. The revolute connection 140 can allow the saddle body 102 to pivot about an axis R defined by the revolute connection 140. The axis R can be substantially parallel to the widthwise axis W. The revolute connection 140 can accommodate rolling forces in the axial direction A.

Figure 1C:
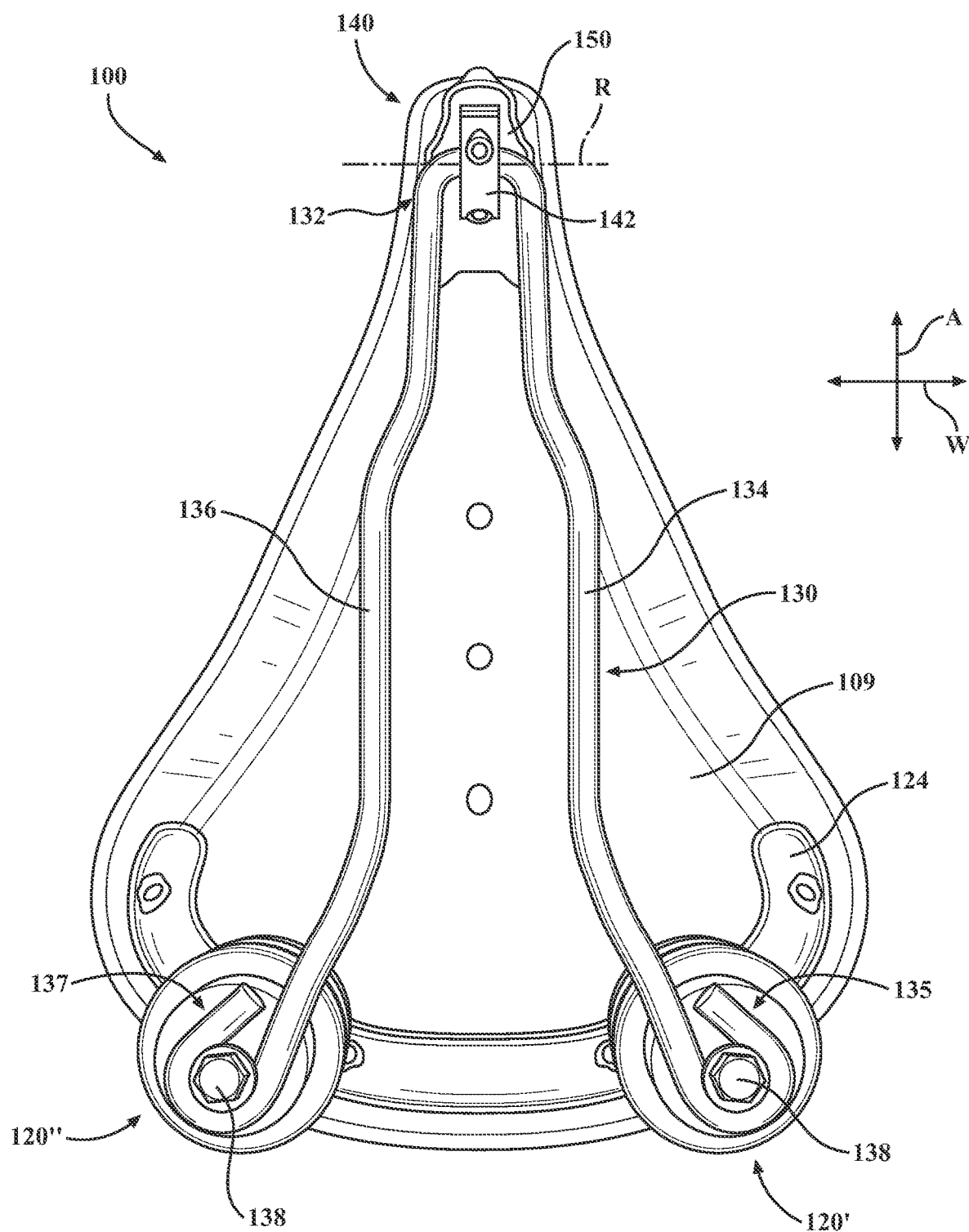
Figure 1D:
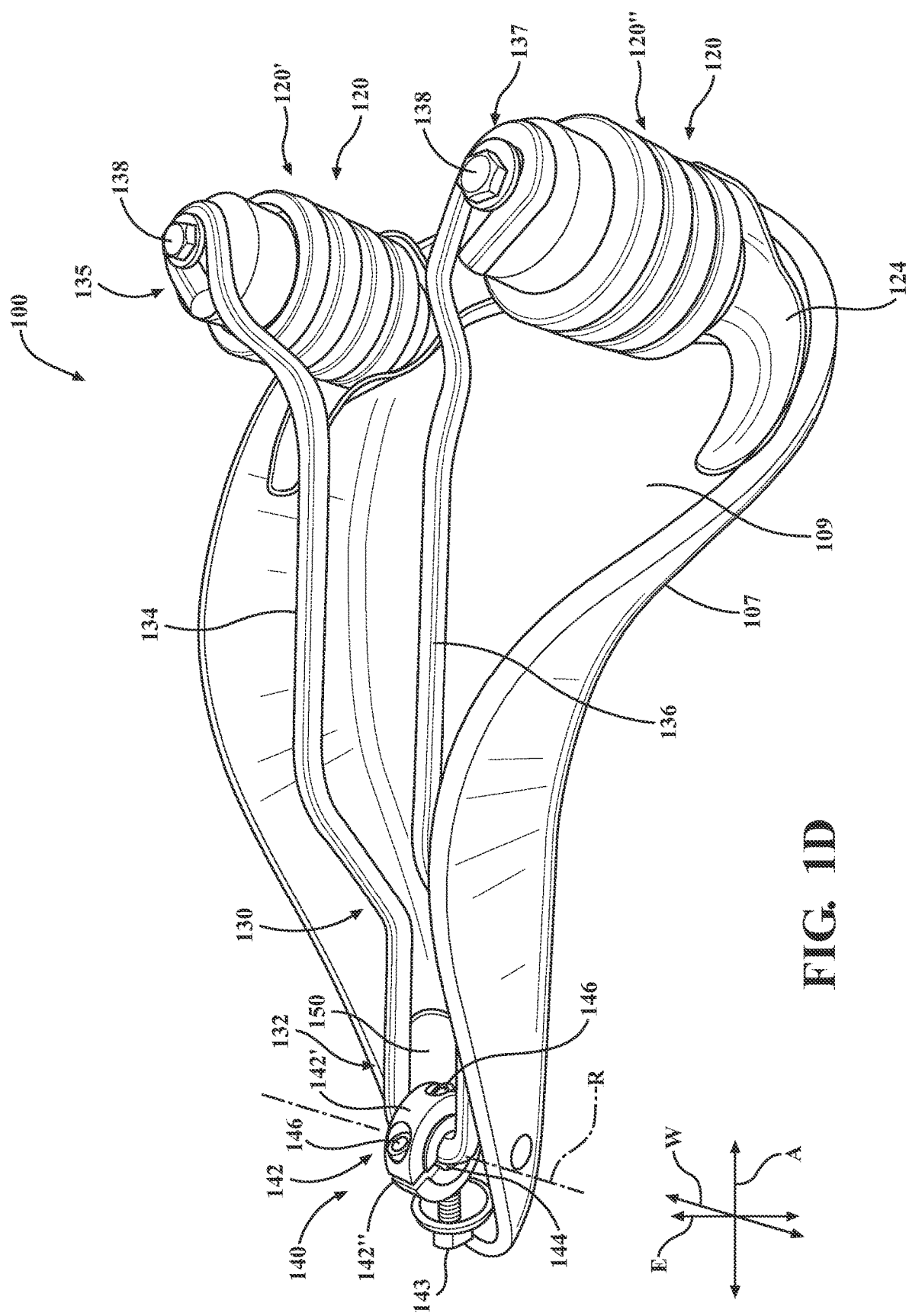

The revolute connection 140 can be achieved in any suitable manner. One example is shown in FIGS. 1C-1D. In this example, the rail member 130 can be operatively connected to the saddle body 102 by a collar 142. In some arrangements, the collar 142 can be made of two collar portions 142', 142". The two collar portions 142', 142" can collectively define a central aperture 144. A portion of the rail member 130 can be received in the central aperture 144. The two collar portions 142', 142" can be operatively connected to each other in any suitable manner. For example, one or more fasteners 146 can be used to operatively connect the two collar portions 142', 142" together. The collar 142 can be made of any suitable material, such as plastic, rubber, or metal, just to name a few possibilities.

The collar 142 can be operatively connected to the saddle body 102. For instance, the collar 142 can be operatively connected to the lower side 109 of the saddle body 102. In one or more arrangements, a bracket 150 can be operatively connected to the saddle body 102, such as one or more fasteners, one or more forms of mechanical engagement, one or more adhesives, one or more other ways, and/or any combination thereof. Similarly, the collar 142 can be operatively connected to the bracket 150 in any suitable manner, such as by one or more fasteners, one or more forms of mechanical engagement, one or more adhesives, one or more other ways, and/or any combination thereof. In one or more arrangements, a fastener 143 can be used to operatively connect the collar 142 and the bracket 150. The fastener 143 can be received in and/or engage an aperture in the collar 142.

The position of the collar 142 can be substantially fixed relative to the saddle body 102. However, the rail member 130 can rotate within the collar 142, thereby providing the revolution connection 140. In some arrangements, one or more bearings can be operatively positioned between the collar 142 and the rail member 130 to facilitate the rotation of the rail member 130. As an example, the bearings can be located at least partially within or at least partially on the collar 142. The bearings can be any suitable type of bearing, now known or later developed.

Figure 2A:
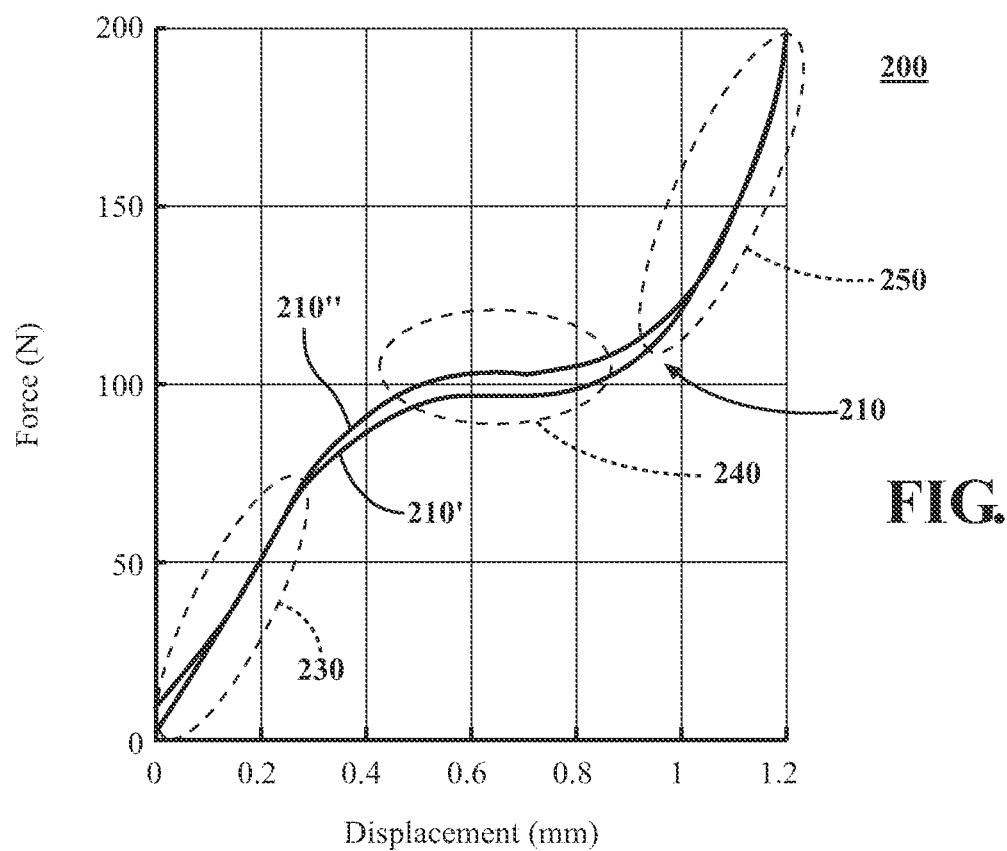
FIG. 2A is an example of a force-deflection curve of a conical spring.

The isolators 120 can be configured to exhibit a non-linear stiffness profile. The non-linear stiffness profile can include a region of quasi-zero stiffness. An example of a force-deflection graph 200 for this type of actuator is shown in FIG. 2A. It is noted that this force-deflection graph 200 is merely an example, as the values will vary depending on various characteristics of the isolator. However, the general shape of a force-deflection curve 210, representing the stiffness profile, is shown. Starting from the origin 220, the isolators 120 can exhibit an initial stiffness region 230 that is substantially linear. The isolator 120 is relatively stiff in the initial stiffness region 230. When load is reached, the force-deflection curve 210 can become zero or substantially zero, which is a quasi-zero stiffness region 240. The quasi-zero stiffness region 240 can allow for good vibration isolation. Continuing beyond the quasi-zero stiffness region 240, the force-deflection curve 210 can have a subsequent stiffness region 250 that is substantially linear. The isolator 120 is relatively stiff in the subsequent stiffness region 250.

It should be noted that there are two force-deflection curves shown in FIG. 2A. A first force-deflection curve 210' represents the isolator 120 going from a non-loaded state to a loaded state. A second force deflection curve 210" represents the isolator 120 going from a loaded state to a non-loaded state.

Figure 2B:
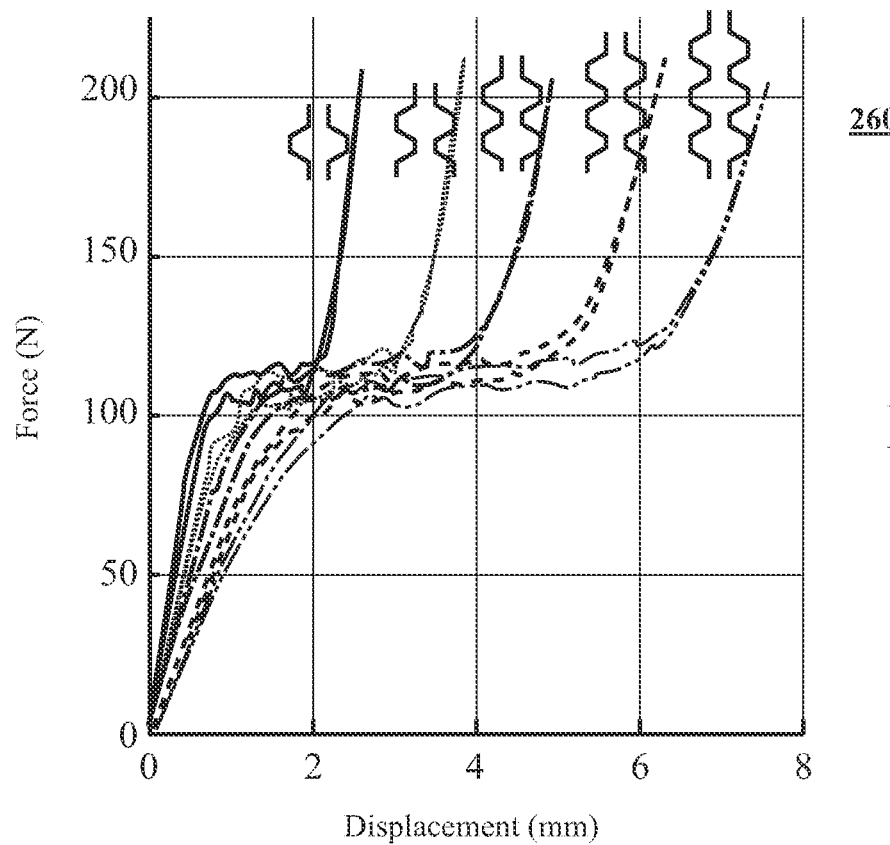
FIG. 2B is an example of the force-deflection curve for various stacks of a plurality of conical springs.

According to arrangements herein, the isolators 120 can include a stack of the plurality of conical springs 300. It should be noted that other terms can be used to describe the conical springs 300 such as Belleville washes, disk springs, conical disks, etc. As more conical springs are added to the stack, the quasi-zero stiffness region 240 of the force-deflection curve 210 can be extended. An example of a force-deflection graph 260 depicting this effect is shown in FIG. 2B. As is evident, the length of the quasi-zero stiffness region increases as the number of conical springs 300 used in the stack increases.

Referring to FIG. 3, an example of a conical spring 300 is shown. The conical spring 300 can have a body 310 with a substantially conical shape. The conical spring 300 can include an outer diameter body portion 320 and an inner diameter body portion 330. The outer diameter body portion 320 can be larger than the inner diameter body portion 330. The conical spring 300 can have a central aperture 340. The conical spring 300 can have a central axis 350. The conical spring can have a height H and a thickness λ. In some arrangements, the conical spring 300 can have a ratio of height H to the thickness λ of about 1 to about 2, about 1.2 to about 1.8, about 1.3 to about 1.5. In some arrangements, the ratio of height H to the thickness λ can be about 1.41.

A plurality of the conical springs 300 can be arranged in any suitable manner in a stack. For instance, in one or more arrangements, the plurality of the conical springs 300 can be arranged in an alternating pattern. For example, the outer diameter body portion 320 of one conical spring 300 can face the outer diameter body portion 320 of a neighboring conical spring 300. Alternatively or additionally, the inner diameter body portion 330 of a conical spring 300 can face the inner diameter body portion 330 of a neighboring conical spring 300. The central apertures 340 of the conical springs 300 can be substantially aligned with each other.

In some arrangements, the stack of the plurality of conical springs 300 does not include a central shaft passes through the central apertures 340 of the plurality of conical springs 300. Alternatively or additionally, the plurality of conical springs 300 does not include an outer sleeve that encloses the plurality of conical springs 300.

There are numerous ways in which the plurality of conical springs 300 can be arranged in a stack. Two examples will be provided herein. However, it will be understood that arrangements are not limited to the two examples described herein.

Figure 4:
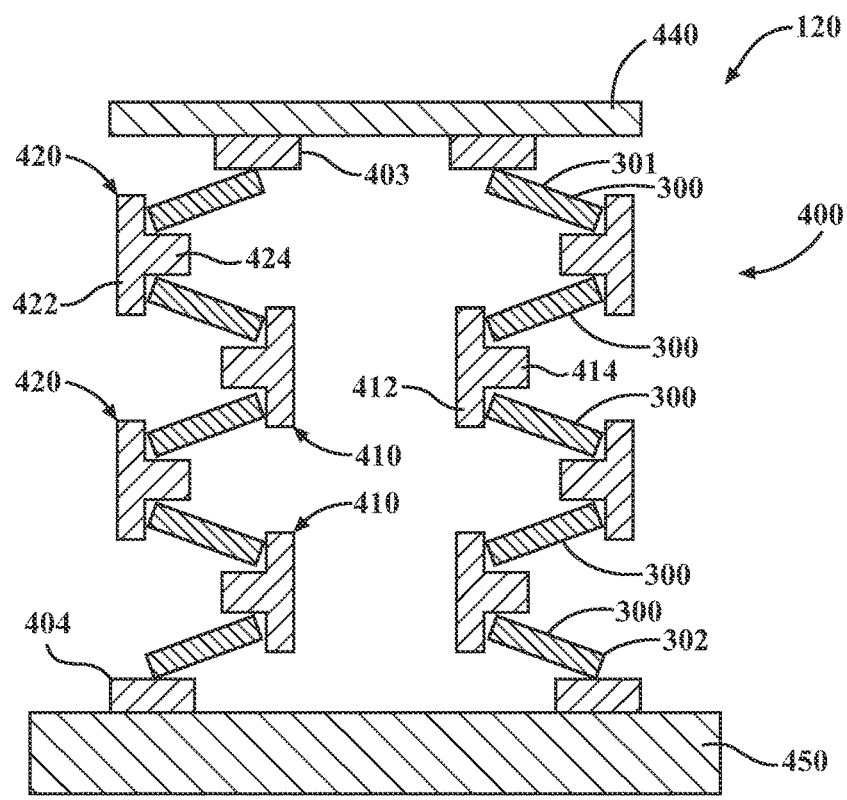
FIG. 4 is a cross-sectional view of a first example of an isolator for the bicycle saddle.

Referring to FIG. 4, a first example of the isolator 120 is shown in a cross-sectional view. The isolator 120 can include a plurality of the conical springs 300 arranged in a stack 400. The stack 400 of the plurality of the conical springs 300 can have a first outermost conical spring 301 and a second outermost conical spring 302.

The isolator 120 can further include a plurality of inner spacers 410 and a plurality of outer spacers 420. The inner spacers 410 can separate the inner diameter body portion 330 of neighboring pairs of the conical springs 300. The outer spacers 420 can separate the outer diameter body portion 320 of neighboring pairs of the conical springs 300. In some arrangements, the plurality of inner spacers 410 can be substantially identical to each other. In other arrangements, at least one of the inner spacers 410 can be different from the other inner spacers 410 in or more respects. In some arrangements, the plurality of outer spacers 420 can be substantially identical to each other. In other arrangements, at least one of the outer spacers 420 can be different from the other outer spacers 420 in or more respects.

The inner spacers 410 and the outer spacers 420 can be generally cylindrical members. In one or more arrangements, the inner spacers 410 and the outer spacers 420 can have a substantially t-shaped cross-sectional shape. Thus, the inner spacers 410 can include an inner wall portion 412 and a transverse ledge portion 414. The transverse ledge portion 414 can extend outwardly from the inner wall portion 412. The transverse ledge portion 414 can be substantially perpendicular to the inner wall portion 412. The outer spacers 420 can include an outer wall portion 422 and a transverse ledge portion 424. The transverse ledge portion 424 can extend inwardly from the outer wall portion 422. The transverse ledge portion 424 can be substantially perpendicular to the outer wall portion 422.

The inner spacers 410 and the outer spacers 420 can be configured as non-locking spacers. Thus, the outer diameter body portion 320 of the conical springs 300 can rest on or contact the transverse ledge portion 424 of the outer spacers 420. Similarly, the inner diameter body portion 330 can rest on or contact the transverse ledge portion 414 of the inner spacers 410. Thus, the inner spacers 410 and the outer spacers 420 do not lockingly engage the conical springs 300.

The isolator 120 can includes a first endcap 440 and a second endcap 450. The first endcap 440 can be operatively connected to and/or operatively positioned with respect to the first outermost conical spring 301 at a first end 401 of the stack 400. In some arrangements, one or more intermediate structures 403 can be located between the first endcap 440 and the first outermost conical spring 301. In other arrangements, the first endcap 440 and the first outermost conical spring 301 can directly contact each other. The second endcap 450 can be is operatively connected to and/or operatively positioned with respect to the second outermost conical spring 302 at a second end 402 of the stack 400. In some arrangements, one or more intermediate structures 404 can be located between the second endcap 450 and the second outermost conical spring 302. In other arrangements, the second endcap 450 and the first outermost conical spring 301 can directly contact each other.

In some arrangements, the first endcap 440 and the second endcap 450 can be substantially identical to each other. In other arrangements, the first endcap 440 and the second endcap 450 can be different from each other in one or more respects. The first endcap 440 and the second endcap 450 can be made of any suitable material.

FIG. 4 shows the conical springs 300 in the stack 400 as being in a neutral position. However, as will be explained in more detail later, the isolator 120 can be configured to allow the conical springs 300 in the stack 400 to become flat or even inverted.

Figure 5:
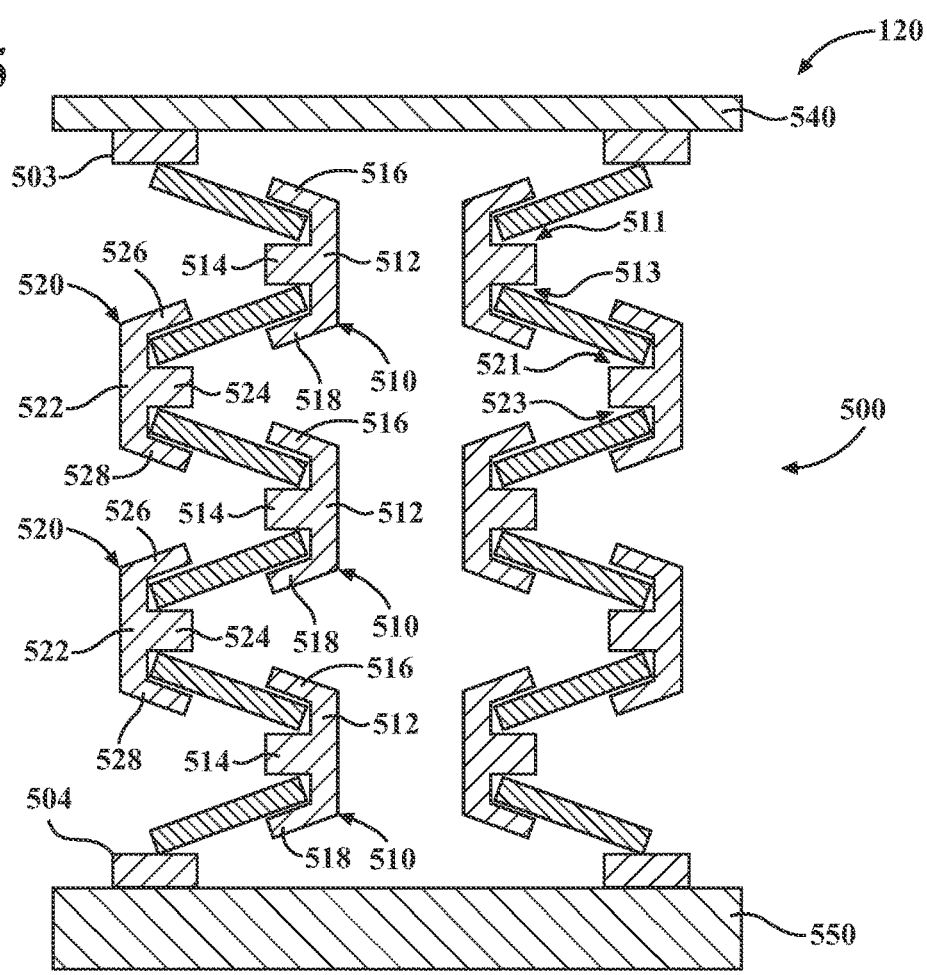
FIG. 5 is a cross-sectional view of a second example of an isolator for the bicycle saddle.

Referring to FIG. 5, a second example of the isolator 120 is shown in a cross-sectional view. The isolator 120 can include a plurality of the conical springs 300 arranged in a stack 500. The stack 500 of the plurality of the conical springs 300 can have a first outermost conical spring 301 and a second outermost conical spring 302.

The isolator 120 can further include a plurality of inner spacers 510 and a plurality of outer spacers 520. The inner spacers 510 can separate the inner diameter body portion 330 of neighboring pairs of the conical springs 300. The outer spacers 520 can separate the outer diameter body portion 320 of neighboring pairs of the conical springs 300. In some arrangements, the plurality of inner spacers 510 can be substantially identical to each other. In other arrangements, at least one of the inner spacers 510 can be different from the other inner spacers 510 in or more respects. In some arrangements, the plurality of outer spacers 520 can be substantially identical to each other. In other arrangements, at least one of the outer spacers 520 can be different from the other outer spacers 520 in or more respects.

The inner spacers 510 and the outer spacers 520 can be generally cylindrical members. In one or more arrangements, the inner spacers 410 and the outer spacers 420 can have a substantially E-shaped or a substantially 3-shaped cross-sectional shape. Thus, the inner spacers 510 can include an inner wall portion 512, a central transverse ledge portion 514, an upper transverse ledge portion 516, and a lower transverse ledge portion 518. It will be appreciated that the terms "upper" and "lower" are used for convenience in this respect relative to the orientation of the inner spacers 510 shown in FIG. 5. However, it will be appreciated that the upper transverse ledge portion 516 and the lower transverse ledge portion 518 may not actually be above or below the central transverse ledge portion 514 depending on the orientation of the isolator 120. A first groove 511 can be defined by the inner wall portion 512, the central transverse ledge portion 514, and the upper transverse ledge portion 516. A second groove 513 can be defined by the inner wall portion 512, the central transverse ledge portion 514, and the lower transverse ledge portion 518.

The central transverse ledge portion 514 can extend outwardly from the inner wall portion 512. The central transverse ledge portion 514 can be substantially perpendicular to the inner wall portion 512. In some arrangements, the upper transverse ledge portion 516 and the lower transverse ledge portion 518 can be non-parallel to the central transverse ledge portion 514. In some arrangements, the upper transverse ledge portion 516 and the lower transverse ledge portion 518 can be non-parallel to each other.

The outer spacers 520 can include an outer wall portion 522, a central transverse ledge portion 524, an upper transverse ledge portion 526, and a lower transverse ledge portion 528. Again, the terms "upper" and "lower" are used merely for convenience in this respect relative to the orientation of the inner spacers 510 shown in FIG. 5. A first groove 521 can be defined by the outer wall portion 522, the central transverse ledge portion 524, and the upper transverse ledge portion 526. A second groove 523 can be defined by the outer wall portion 522, the central transverse ledge portion 524, and the lower transverse ledge portion 528.

The central transverse ledge portion 524 can extend outwardly from the outer wall portion 522. The central transverse ledge portion 524 can be substantially perpendicular to the outer wall portion 522. In some arrangements, the upper transverse ledge portion 526 and the lower transverse ledge portion 528 can be non-parallel to the central transverse ledge portion 524. In some arrangements, the upper transverse ledge portion 526 and the lower transverse ledge portion 528 can be non-parallel to each other.

The inner spacers 510 and the outer spacers 520 can be configured as locking spacers. The outer diameter body portion 320 of the conical springs 300 can be received in one of the first groove 521 and the second groove 523 of the outer spacer 520. Thus, the outer diameter body portion 320 of the conical springs 300 can be lockingly engaged by and/or retainably received in the respective one of the first groove 521 and the second groove 523 of the outer spacer 520. Similarly, the inner diameter body portion 330 of the conical springs 300 can be received in one of the first groove 511 and the second groove 513 of the inner spacer 510. Thus, the inner diameter body portion 330 of the conical springs 300 can be lockingly engaged by and/or retainably received in the respective one of the first groove 511 and the second groove 513 of the inner spacer 510.

The isolator 120 can includes a first endcap 540 and a second endcap 550. The first endcap 540 can be operatively connected to and/or operatively positioned with respect to the first outermost conical spring 301 at a first end 501 of the stack 500. In some arrangements, one or more intermediate structures 503 can be located between the first endcap 440 and the first outermost conical spring 301. In other arrangements, the first endcap 540 and the first outermost conical spring 301 can directly contact each other. The second endcap 550 can be operatively connected to and/or operatively positioned with respect to the second outermost conical spring 302 at a second end 502 of the stack 500. In some arrangements, one or more intermediate structures 504 can be located between the second endcap 550 and the second outermost conical spring 302. In other arrangements, the second endcap 550 and the second outermost conical spring 302 can directly contact each other.

In some arrangements, the first endcap 540 and the second endcap 550 can be substantially identical to each other. In other arrangements, the first endcap 540 and the second endcap 550 can be different from each other in one or more respects. The first endcap 540 and the second endcap 550 can be made of any suitable material.

FIG. 4 shows an example in which the inner spacers 410 and the outer spacers 420 are non-locking spacers, and FIG. 5 shows an example in which the inner spacers 510 and the outer spacers 520 are locking spacers. However, it will be understood that arrangements described herein are not limited in this regard. Indeed, the isolators 120 can use any combination of locking and non-locking spacers for the inner spacers and/or the outer spacer. For example, the inner spacers can be locking spacers, and the outer spacers can be non-locking spacers, or vice versa. As another example, the inner spacers can be all locking spacers, all non-locking spacers, or any combination of locking spacers and non-locking spacers. Similarly, the outer spacers can be all locking spacers, all non-locking spacers, or any combination of locking spacers and non-locking spacers.

Further, it will be appreciated that the two isolator configurations designs are not the only isolator configurations that can be used. Indeed, additional examples of the isolators can include any of those disclosed in U.S. Pat. Nos. 10,371, 229 and 10,677,310 as well as U.S. Patent Publ. No. 2019/0186589, which are incorporated herein by reference in their entireties.

Figure 6A:
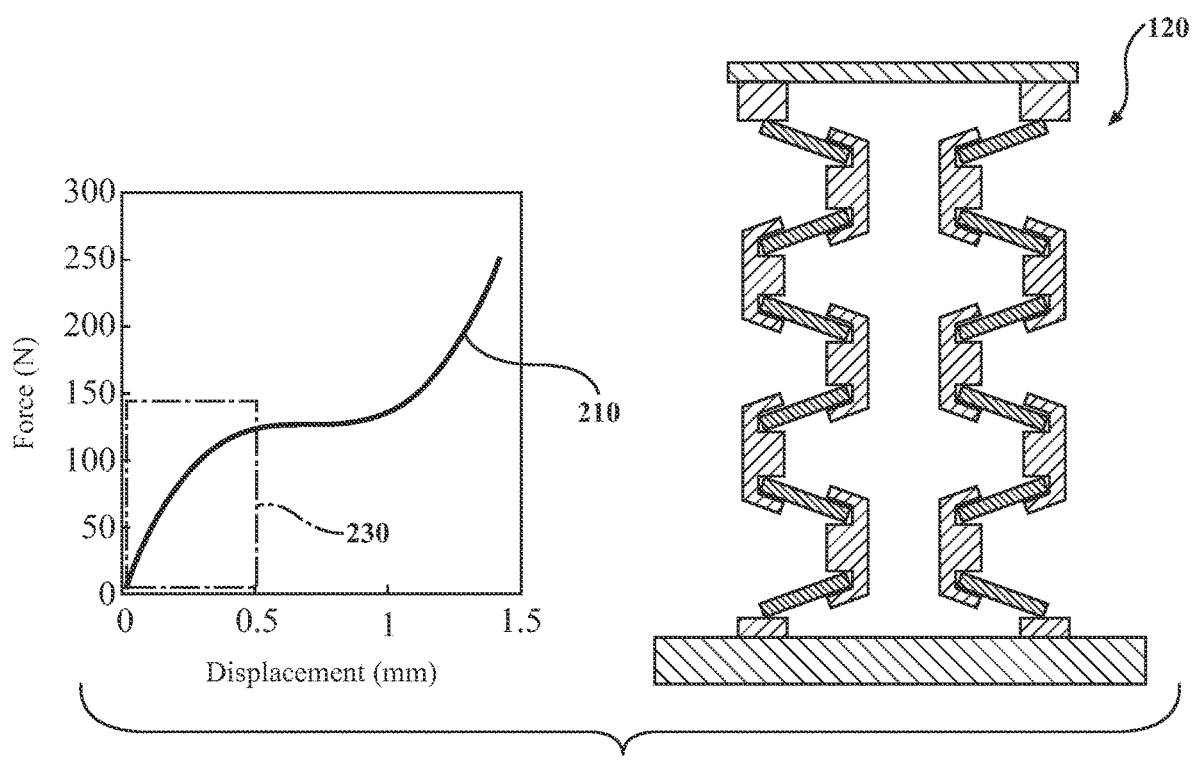
FIG. 6A-6C show the state of the isolator shown in FIG. 5 at various regions of the force-deflection curve.
Figure 6B:
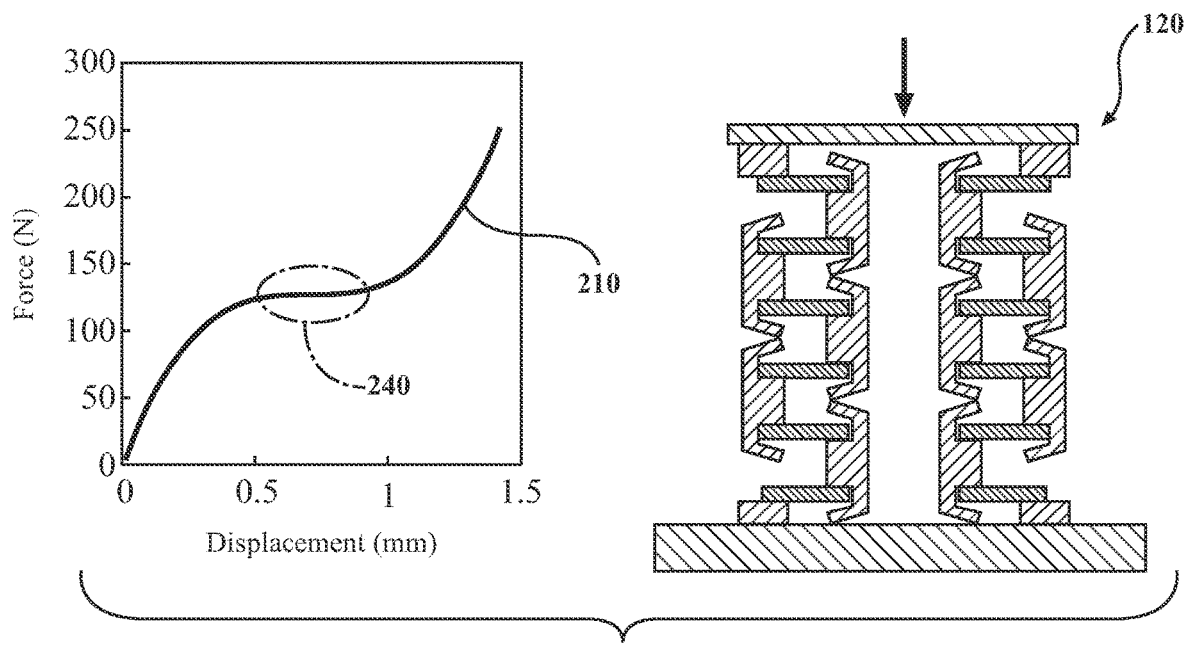
Figure 6C:
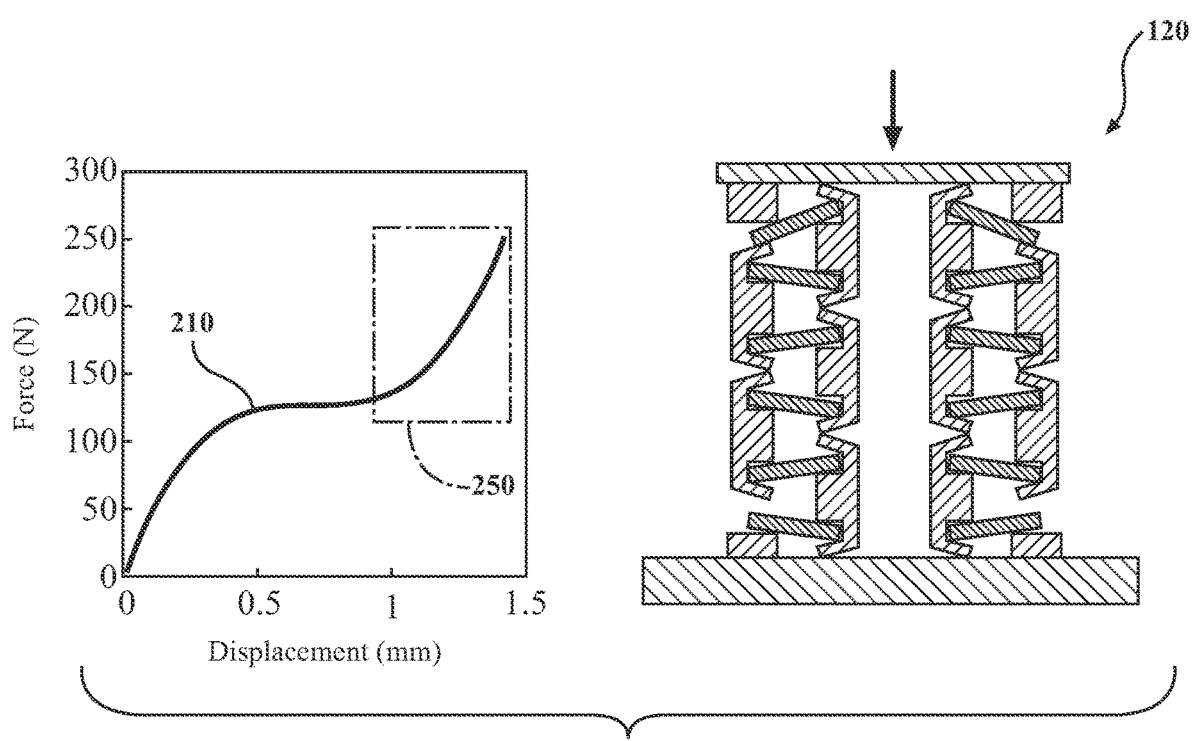

FIG. 6A-6C show the state of the isolator 120 of FIG. 5 in various regions of the force-deflection curve. FIG. 6A shows a representation of the isolator 120 in the initial stiffness region 230 of the force-deflection curve 210. As can be seen, the conical springs 300 can be substantially in their neutral condition. In the initial stiffness region 230, the stiffness curve is substantially linear, increasing from the origin of the graph. The isolator 120 can be relatively stiff in the initial stiffness region 230.

In FIG. 6B, the isolator 120 is in the quasi-zero stiffness region 240 of the force-deflection curve 210. In the quasi-zero stiffness region 240, the force-deflection curve becomes substantially flat. The stiffness becomes very low—zero or substantially zero. The quasi-zero stiffness region 240 allows for good isolation. In the quasi-zero stiffness region 240, the conical springs 300 can become substantially flat.

In FIG. 6C, the isolator can be in the subsequent stiffness region 250. In the subsequent stiffness region 250, the stiffness curve can be substantially linear, increasing from the end of the quasi-zero stiffness region 240. The isolator 120 can be relatively stiff in the initial stiffness region 230. As can be seen, the conical springs 300 can become inverted relative to their initial shape. It will be appreciated that the configuration of the isolator 120 allows such inversion to occur.

It will be appreciated that the characteristics of the quasi-zero stiffness region can be tuned to attain the desired performance characteristics. Such tuning can be achieved by changing the characteristics of the conical springs, the quantity of the conical springs, the arrangement of the conical springs, other components of the isolators, and/or other factors, just to name a few possibilities.

Figure 7A:
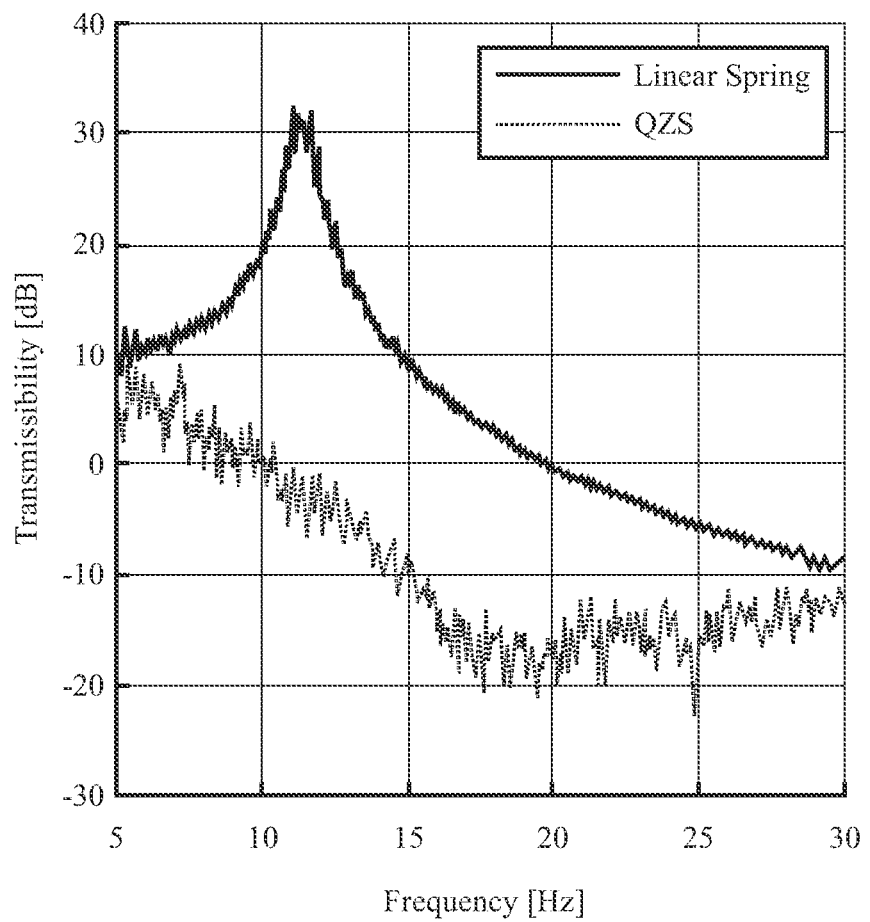
FIG. 7A is an example of the isolation performance of an isolator in vertical vibration.
Figure 7B:
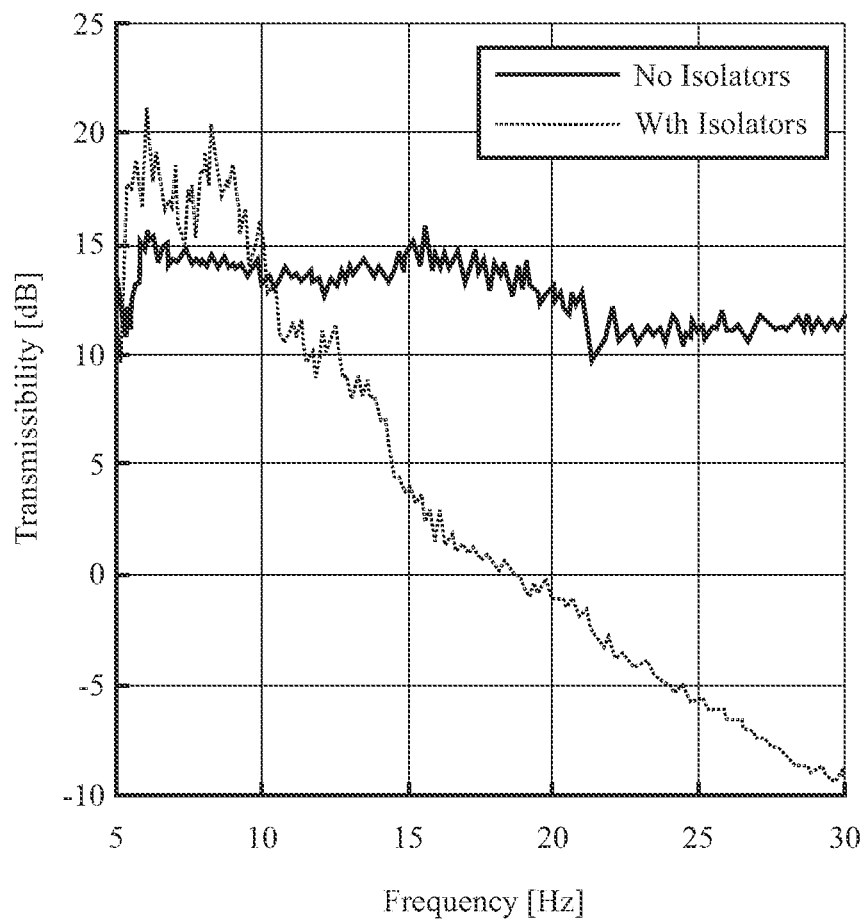
FIG. 7B is an example of the isolation performance of an isolator in roll vibration.

FIGS. 7A-7B show examples of the performance benefits that may be achieved by using isolators in accordance with arrangements herein. FIG. 7A is an example of the isolation performance in vertical vibration of an isolator according to arrangements described herein compared to a linear spring. FIG. 7B is an example of the isolation performance in roll vibration of an isolator according to arrangements described herein compared to no isolators being used.

It will be appreciated that arrangements described herein can provide numerous benefits, including one or more of the benefits mentioned herein. For example, arrangements described herein can isolate the vibrations of a bicycle saddle. Arrangements described herein can improve rider comfort and/or ride quality. Arrangements described here can use isolators with low cost components (e.g., conical springs). Arrangements described herein uses a least three connection points of the saddle (e.g., at least two isolators in the rear region of the saddle and a revolute connection in the front region of the saddle). As a result, the isolators can avoid the use of a central shaft and/or an outer sleeve. Arrangements described herein provide a bicycle seat that is configured to address roll and pitch motions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A bicycle saddle comprising:
   a saddle body, the saddle body including a front region and a rear region;
   a plurality of isolators operatively connected to the saddle body in the rear region, each of the plurality of isolators including a stack of a plurality of conical springs, the stack of the plurality of conical springs not including a central shaft; and
   a rail member, the rail member being operatively connected to the plurality of isolators, the rail member being operatively connected to the saddle body in the front region.

2. The bicycle saddle of claim 1, wherein the rail member is operatively connected to the saddle body in the front region by a revolute connection.

3. The bicycle saddle of claim 1, wherein the plurality of isolators are configured to exhibit a non-linear stiffness profile including a region of quasi-zero stiffness.

4. The bicycle saddle of claim 1, wherein the stack of the plurality of conical springs is arranged in an alternating pattern, wherein each of the plurality of conical springs includes an outer diameter body portion and an inner diameter body portion, and wherein, for each of the plurality of conical springs, at least one of:
   the outer diameter body portion faces the outer diameter body portion of a neighboring one of the plurality of conical springs; and
   the inner diameter body portion faces the inner diameter body portion of a neighboring one of the plurality of conical springs.

5. The bicycle saddle of claim 1, wherein the stack of the plurality of conical springs does not include an outer sleeve.

6. The bicycle saddle of claim 4, wherein each of the plurality of isolators includes a plurality of inner spacers, and wherein the inner spacers separate the inner diameter body portion of a neighboring pair of the conical springs.

7. The bicycle saddle of claim 6, wherein the plurality of inner spacers are configured as locking spacers, whereby the plurality of inner spacers lockingly engage the inner diameter body portion of the neighboring pair of the conical springs.

8. The bicycle saddle of claim 6, wherein the plurality of inner spacers are configured as non-locking spacers.

9. The bicycle saddle of claim 4, wherein each of the plurality of isolators includes a plurality of outer spacers, and wherein the outer spacers separate the outer diameter body portion of a neighboring pair of the conical springs.

10. The bicycle saddle of claim 9, wherein the plurality of outer spacers are configured as locking spacers, whereby the plurality of outer spacers lockingly engage the outer diameter body portion of the neighboring pair of the conical springs.

11. The bicycle saddle of claim 9, wherein the plurality of outer spacers are configured as non-locking spacers.

12. The bicycle saddle of claim 1, wherein each of the plurality of isolators is configured to allow the stack of the plurality of conical springs to become inverted.

13. The bicycle saddle of claim 1, wherein each of the isolators includes a first endcap and a second endcap, wherein the first endcap is operatively connected to a first outermost conical spring at a first end of the stack of the plurality of conical springs, and wherein the second endcap is operatively connected to a second outermost conical spring at a second end of the stack of the plurality of conical springs.

14. The bicycle saddle of claim 1, wherein each of the conical springs includes a thickness and a height, and wherein a ratio of height to the thickness is about 1.41.

15. A bicycle saddle comprising:
a saddle body, the saddle body including a front region and a rear region;
a plurality of isolators operatively connected to the saddle body in the rear region, the plurality of isolators being configured to exhibit a non-linear stiffness profile including a region of quasi-zero stiffness, each of the plurality of isolators including a stack of a plurality of conical springs, the stack of the plurality of conical springs not including a central shaft, each of the plurality of isolators including a plurality of spacers, each of the spacers separating a neighboring pair of the plurality of conical springs; and
a rail member, the rail member being operatively connected to the plurality of isolators, the rail member being operatively connected to the saddle body in the front region.

16. The bicycle saddle of claim 15, wherein each of the conical springs includes a thickness and a height, and wherein a ratio of height to the thickness is about 1.41.

17. The bicycle saddle of claim 15, wherein each of the plurality of isolators is configured to allow the stack of a plurality of the conical springs to become inverted.

18. The bicycle saddle of claim 15, wherein the stack of the plurality of conical springs does not include an outer sleeve.

19. The bicycle saddle of claim 15, wherein the rail member is operatively connected to the saddle body in the front region by a revolute connection.

* * * * *